(12) United States Patent
Furukawa

(10) Patent No.: US 12,339,173 B2
(45) Date of Patent: Jun. 24, 2025

(54) ABNORMAL TEMPERATURE DETECTION DEVICE, ABNORMAL TEMPERATURE DETECTION METHOD, AND NON-TRANSITORY COMPUTER READABLE STORAGE MEDIUM

(71) Applicant: Yokogawa Electric Corporation, Musashino (JP)

(72) Inventor: Osamu Furukawa, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 397 days.

(21) Appl. No.: 17/545,669

(22) Filed: Dec. 8, 2021

(65) Prior Publication Data
US 2022/0187140 A1    Jun. 16, 2022

(30) Foreign Application Priority Data
Dec. 14, 2020    (JP) ................ 2020-206831

(51) Int. Cl.
*G01K 3/00* (2006.01)
(52) U.S. Cl.
CPC ......... *G01K 3/005* (2013.01); *G01K 2219/00* (2013.01)
(58) Field of Classification Search
CPC .......................... G01K 3/005; G01K 2219/00
See application file for complete search history.

(56) References Cited

U.S. PATENT DOCUMENTS

| | | | | |
|---|---|---|---|---|
| 2014/0195184 A1* | 7/2014 | Maeda | ............... | G05B 21/02 |
| | | | | 702/183 |
| 2019/0005433 A1* | 1/2019 | Sekine | ............... | G05B 23/0235 |
| 2019/0012904 A1* | 1/2019 | Yusuf | ............... | G08B 21/182 |
| 2020/0150159 A1* | 5/2020 | Takeda | ............... | G01R 19/2506 |
| 2022/0136909 A1* | 5/2022 | Kim | ............... | G06F 1/206 |
| | | | | 702/136 |

FOREIGN PATENT DOCUMENTS

| | | | |
|---|---|---|---|
| CN | 112128950 A | * | 12/2020 |
| JP | 5808605 B2 | | 11/2015 |
| JP | 6076571 B1 | | 2/2017 |

OTHER PUBLICATIONS

Mell et al., "The NIST Definition of Cloud Computing", Recommendations of the National Institute of Standards and Technology, Special Publication 800-145, (2011). Cited in Specification. (7 pages).

* cited by examiner

*Primary Examiner* — Natalie Huls
*Assistant Examiner* — Nyla Gavia
(74) *Attorney, Agent, or Firm* — WHDA, LLP

(57) ABSTRACT

An abnormal temperature detection device includes a temperature acquirer configured to acquire temperature data; a preprocessor configured to perform preprocessing of calculating a feature amount of the temperature data; a synthesizer configured to perform synthesis processing of synthesizing the feature amount and past determination information indicating whether the temperature data acquired in the past is normal or abnormal; a learner configured to generate an identification model by performing machine learning on a result of synthesis by the synthesizer; and a determiner configured to determine whether temperature data for detection which is acquired by the temperature acquirer, and on which the preprocessing is performed by the preprocessor and the synthesis processing is performed by the synthesizer, is normal or abnormal by using the identification model.

11 Claims, 4 Drawing Sheets

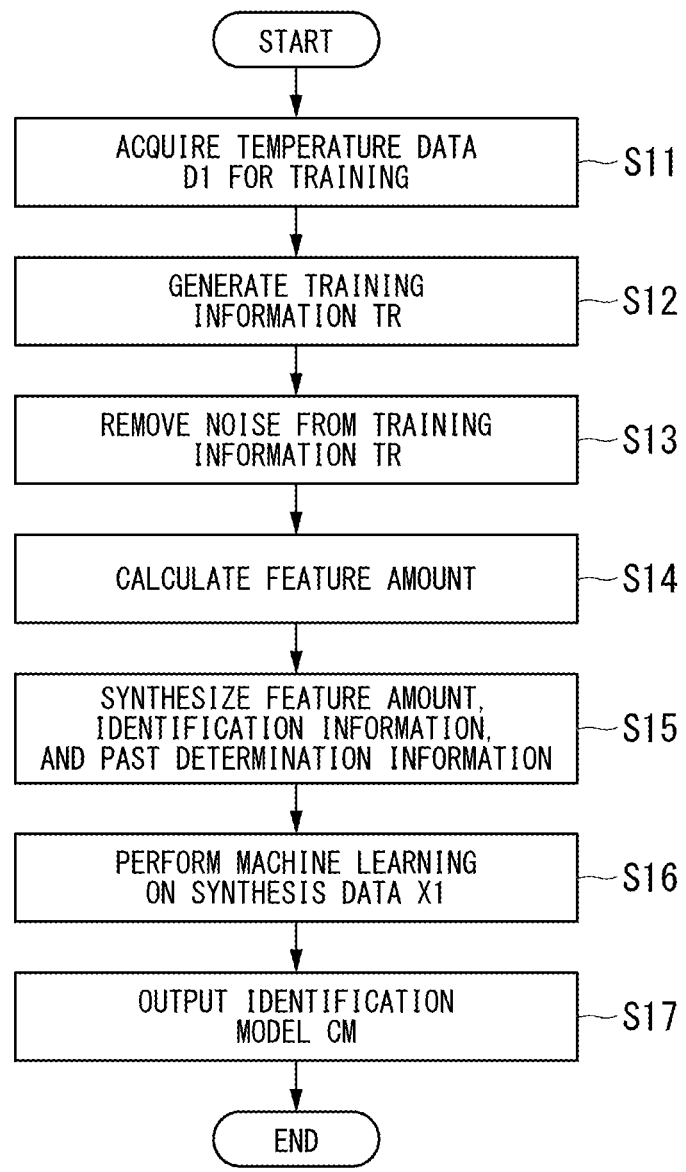

ABNORMAL TEMPERATURE DETECTION DEVICE, ABNORMAL TEMPERATURE DETECTION METHOD, AND NON-TRANSITORY COMPUTER READABLE STORAGE MEDIUM

BACKGROUND

Field of the Invention

The present invention relates to an abnormal temperature detection device, an abnormal temperature detection method, and a non-transitory computer readable storage medium.

Priority is claimed on Japanese Patent Application No. 2020-206831, filed on Dec. 14, 2020, the contents of which are incorporated herein by reference.

Description of Related Art

When an accident such as a fire in a residential building, a fire in a coal-fired power plant, or a leak of molten steel in a steelworks occurs, it can result in loss of life and opportunity. For this reason, it is extremely important to detect an abnormal temperature caused by occurrence of an accident from the viewpoint of avoiding loss of life and opportunity. The abnormal temperature may be a temperature that has significantly fallen as compared to that in the normal state, in addition to a temperature that has significantly risen as compared to that in the normal state.

Japanese Patent No. 6076571 and Japanese Patent No. 5808605 disclose conventional technologies for detecting an abnormal state (including an abnormal temperature). For example, the technologies disclosed in Japanese Patent No. 6076571 below create reference data indicating a normal state by dividing cyclically repeated data into data of each cycle (cyclic data) and averaging a plurality of pieces of cyclic data. Then, the abnormal state is detected on the basis of a deviation value between the measured cyclic data and reference data.

Incidentally, in the technology disclosed in Japanese Patent No. 6076571 described above, when the deviation value becomes larger than a predetermined margin of error (threshold value), it is determined to be an abnormal state. In a determination method using such a threshold value, when there is an uptrend or a downtrend in the change of an ambient temperature (when the ambient temperature tends to rise or fall), the change of the ambient temperature and the change of a temperature due to a fire or the like cannot be distinguished in some cases. In particular, when there is no significant difference between the amount of change in ambient temperature and the amount of change in temperature due to a fire or the like, it is difficult to appropriately determine that an abnormal temperature has occurred.

SUMMARY

An abnormal temperature detection device may include: a temperature acquirer configured to acquire temperature data; a preprocessor configured to perform preprocessing of calculating a feature amount of the temperature data; a synthesizer configured to perform synthesis processing of synthesizing the feature amount and past determination information indicating whether the temperature data acquired in the past is normal or abnormal; a learner configured to generate an identification model by performing machine learning on a result of synthesis by the synthesizer; and a determiner configured to determine whether temperature data for detection which is acquired by the temperature acquirer, and on which the preprocessing is performed by the preprocessor and the synthesis processing is performed by the synthesizer, is normal or abnormal by using the identification model.

Further features and aspects of the present disclosure will become apparent from the following detailed description of exemplary embodiments with reference to the attached drawings.

BRIEF DESCRIPTION OF THE DRAWINGS

FIG. 3 is a flowchart which shows an outline of operations at the time of training of the abnormal temperature detection device according to the embodiment of the present invention.

DESCRIPTION OF EMBODIMENTS

Figure 1:
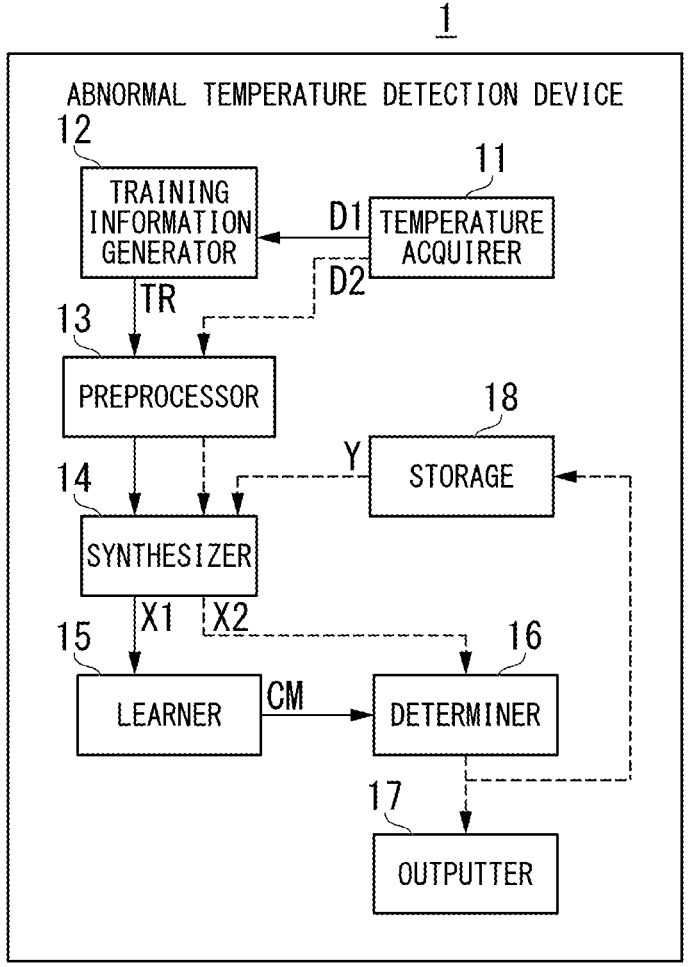
FIG. 1 is a block diagram which shows a configuration of a main part of an abnormal temperature detection device according to one embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an abnormal temperature detection device, an abnormal temperature detection method, and non-transitory computer readable storage medium that can detect an abnormal temperature with high accuracy even when there is a change in ambient temperature.

Hereinafter, an abnormal temperature detection device, an abnormal temperature detection method, and an abnormal temperature detection program according to the embodiment of the present invention will be described with reference to the drawings. In the following description, an outline of the embodiment of the present invention will be described first, and details of each embodiment of the present invention will be subsequently described.

[Outline]

In an embodiment of the present invention, it is possible to detect an abnormal temperature with high accuracy even when there is a change in ambient temperature. For example, even if there is an uptrend or downtrend in the change of an ambient temperature and even if there is no big difference between the amount of change in ambient temperature and the amount of change in temperature due to fire, or the like, an abnormal temperature can be detected with high accuracy.

For those who are not familiar with a mechanism of a temperature rise, it is extremely difficult to set a threshold value for determining an abnormal temperature. For this reason, in the technology disclosed in Japanese Patent No. 6076571 described above, a fully experienced veteran worker needs to change and adjust reference data to set a threshold value to detect an abnormality in equipment such as a plant. In addition, Japanese Patent No. 5808605 described above discloses a method of linking maintenance history information of a veteran worker with sensor data by a related keyword, and detecting a sign of abnormality by clustering and a multivariate analysis.

However, the technology disclosed in Japanese Patent No. 6076571 and Japanese Patent No. 5808605 described above sets a threshold value by using a large amount of maintenance history information by a veteran worker. For this reason, for example, it cannot be applied to new equipment having almost no maintenance history information. For this reason, when the maintenance history information is scarce, it is considered extremely difficult to set an appropriate threshold value. Moreover, for example, when there is no large difference between the amount of change in ambient temperature and the amount of change in temperature due to a fire or the like, it is extremely difficult to correctly detect a temperature abnormality. For example, a situation in which an alarm is delayed when a threshold value for distinguishing the amount of change in ambient temperature and the amount of change in temperature due to fire or the like is set to be too high, and conversely, a situation in which an erroneous alarm is issued when the threshold value is set too low can be considered.

In the embodiment of the present invention, first, in a training stage, preprocessing of calculating a feature amount of temperature data acquired by a temperature acquirer is performed, and synthesis processing of synthesizing the calculated feature amount and past determination information indicating whether temperature data acquired in the past is normal or abnormal is performed. Then, an identification model is generated by performing machine learning on a result of the synthesis processing. Next, in a detection stage, it is determined whether temperature data for detection acquired by the temperature acquirer and subjected to preprocessing and synthesis processing is normal or abnormal by using the identification model. As a result, even if there is a change in ambient temperature, an abnormal temperature can be detected with high accuracy.

[Details]

<Abnormal Temperature Detection Device>

FIG. 1 is a block diagram which shows a configuration of a main part of an abnormal temperature detection device according to an embodiment of the present invention. As shown in FIG. 1, the abnormal temperature detection device 1 of the present embodiment includes a temperature acquirer 11 (a temperature acquisition device), a training information generator 12, a preprocessor 13 (a preprocessing device), a synthesizer 14 (a synthesis device), a learner 15 (a learning device), a determiner 16 (a determination device), an outputter 17, and a storage 18.

Such an abnormal temperature detection device 1 performs machine learning using temperature data D1 for training acquired by the temperature acquirer 11, and determines whether temperature data D2 for detection acquired by the temperature acquirer 11 is normal or abnormal using a result of performing the machine learning. The temperature data D1 for training described above is temperature data whose normality or abnormality is known, and the temperature data D2 for detection described above is temperature data for which it is to be determined whether it is an abnormal temperature.

In FIG. 1, for ease of understanding, a signal path between blocks at the time of training is shown by a solid line, and a signal path between blocks at the time of detection is shown by a broken line. The abnormal temperature detection device 1 switches between performing machine learning and detecting an abnormal temperature when, for example, a predetermined condition is satisfied, or when there is an instruction from a user of the abnormal temperature detection device 1.

Here, an abnormal temperature is a temperature that has significantly risen as compared to a normal state, or a temperature that has significantly fallen as compared to the normal state. In the present embodiment, the case where a temperature has significantly risen as compared with the normal state is detected as an abnormal temperature will be described as an example. A normal temperature waveform and an abnormal temperature waveform are not fixed, and can be changed to any temperature waveform depending on a situation in which the abnormal temperature detection device 1 is used.

The temperature acquirer 11 acquires temperature data, which is time-series data indicating a change in temperature over time. The temperature acquirer 11 outputs temperature data (the temperature data D1 for training) acquired at the time of training to the training information generator 12. On the other hand, the temperature acquirer 11 outputs temperature data (the temperature data D2 for detection) acquired at the time of detection to the preprocessor 13.

The temperature acquirer 11 acquires, for example, temperature data output from temperature sensors such as thermocouples, temperature measurement resistors, thermistors, crystal transducers, infrared radiation thermometers, and optical fiber temperature sensors. The temperature acquirer 11 includes an analog-to-digital converter (ADC), and when an analog signal is output from the temperature sensor, it acquires a digitized signal as temperature data. The temperature data acquired by the temperature acquirer 11 may be obtained for each sampling cycle of the ADC, or may be obtained by thinning out the data obtained for each sampling cycle of the ADC at predetermined time intervals.

The training information generator 12 generates training information TR with identification information indicating whether the temperature data D1 for training is normal or abnormal for the temperature data D1 for training acquired by the temperature acquirer 11 when machine learning is performed by the learner 15. The identification information is created by, for example, a user who uses the abnormal temperature detection device 1.

The training information generator 12 generates, for example, training information TR with identification information indicating that the temperature data D1 for training is normal, and training information TR with identification information indicating that the temperature data D1 for training is abnormal. The training information generator 12 may generate only the training information TR with the identification information indicating that the temperature data D1 for training is normal. Alternatively, the training information generator 12 may generate only the training information TR with the identification information indicating that the temperature data D1 for training is abnormal. In addition, the training information TR may be generated on the basis of a simulation calculation simulating a temperature of a measurement target of the abnormal temperature detection device 1.

The preprocessor 13 performs preprocessing required in advance to perform machine learning or detect an abnormal temperature with respect to the temperature data D1 for training included in the training information TR generated by the training information generator 12 or the temperature data D2 for detection output from the temperature acquirer 11. Specifically, the preprocessor 13 performs processing of removing noise superimposed on the temperature data D1 for training or the temperature data D2 for detection when necessary, and then performs processing of calculating a feature amount of the temperature data D1 for training or the temperature data D2 for detection.

When machine learning is performed by the learner 15, the preprocessor 13 calculates, for example, at least one of a standard deviation, a first-order difference, and a second-order difference of the temperature data D1 for training (or the averaged temperature data D1 for training) as a feature amount. When it is determined whether the temperature data D2 for detection is normal or abnormal by the determiner 16, the preprocessor 13 calculates at least one of a standard deviation, a first-order difference, and a second-order difference of the temperature data D2 for detection (or the averaged temperature data D2 for detection) as a feature amount.

Here, the standard deviation of the temperature data can be used as a feature amount indicating a magnitude of a change in temperature. In addition, the first-order difference of the temperature data can be used as a feature amount indicating a tendency (trend) of the change in temperature. Moreover, the second-order difference of the temperature data can be used as a feature amount indicating the change in temperature excluding the trend. A difference sequence of the temperature data (the first-order difference, the second-order difference) can be used as a feature amount excluding changes in ambient temperature such as daily fluctuations and seasonal fluctuations in temperature.

Figure 2A:
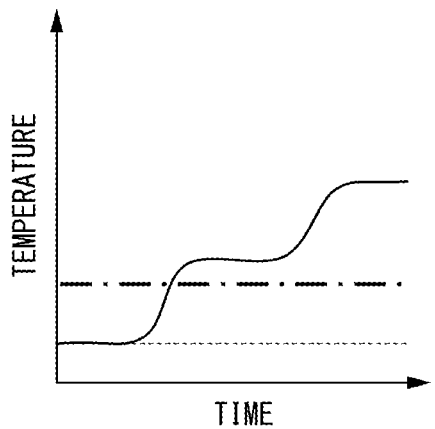
FIG. 2A is a diagram which describes a feature amount used in the embodiment of the present invention.
Figure 2B:
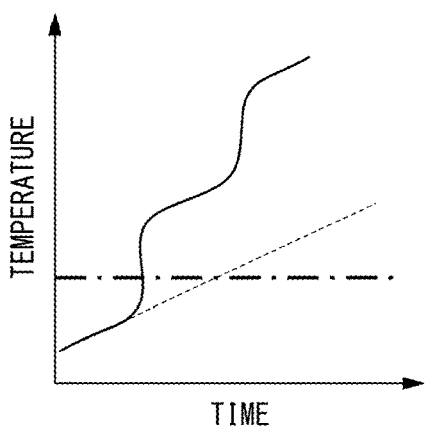
FIG. 2B is a diagram which describes a feature amount used in the embodiment of the present invention.
Figure 2C:
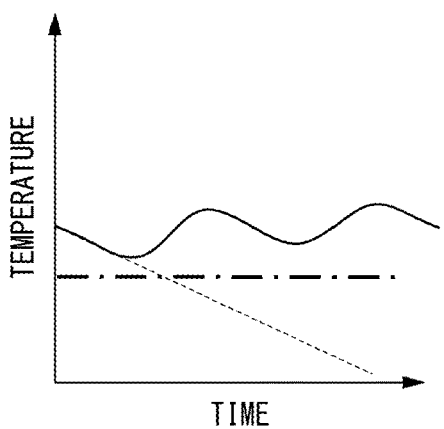
FIG. 2C is a diagram which describes a feature amount used in the embodiment of the present invention.
Figure 2D:
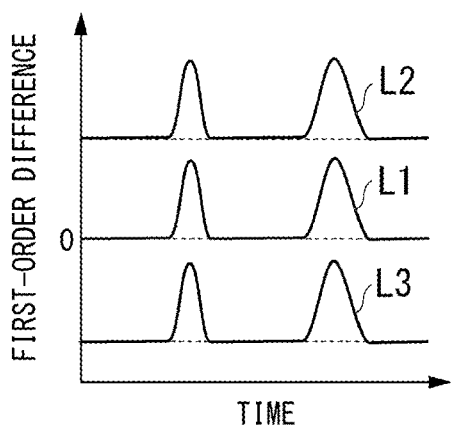
FIG. 2D is a diagram which describes a feature amount used in the embodiment of the present invention.
Figure 2E:
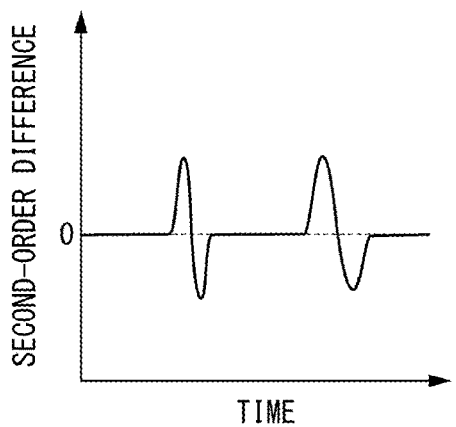
FIG. 2E is a diagram which describes a feature amount used in the embodiment of the present invention.

FIGS. 2A to 2E are diagrams for describing a feature amount used in one embodiment of the present invention. FIGS. 2A to 2C are graphs which show examples of a change in temperature over time, and FIGS. 2D and 2E are graphs which show feature amounts calculated when there is the change in temperature over time exemplified in FIGS. 2A to 2C. In the graphs shown in FIGS. 2A to 2C, the broken line indicates a change in ambient temperature over time, and the solid line indicates a change in temperature over time obtained by adding an abnormal temperature and an ambient temperature due to a fire or the like. In addition, the alternate long and short dash line indicates a threshold temperature (a threshold value) in the prior art set to detect the abnormal temperature. In the examples shown in FIGS. 2A to 2C, the amounts of changes in temperature due to a fire or the like are set to be the same for easy understanding.

The example shown in FIG. 2A shows that the ambient temperature does not change because a slope of the broken line is zero. The example shown in FIG. 2B shows that there is an uptrend in the change in ambient temperature because the slope of the broken line is positive. The example shown in FIG. 2C shows that there is a downtrend in the change in ambient temperature because the slope of the broken line is negative.

Here, in the examples shown in FIGS. 2A to 2C, a case where the abnormal temperature is detected using the threshold temperature indicated by the alternate long and short dash line is considered. In the example shown in FIG. 2A, the ambient temperature indicated by the broken line does not pass the threshold temperature, and the temperature indicated by the solid line (the temperature obtained by adding the abnormal temperature and the ambient temperature) passes the threshold temperature. For this reason, the abnormal temperature can be detected when the temperature indicated by the solid line passes the threshold temperature.

On the other hand, in the example shown in FIG. 2B, both the ambient temperature indicated by the broken line and the temperature indicated by the solid line rise above the threshold temperature, and in the example shown in FIG. 2C, only the ambient temperature indicated by the broken line falls below the threshold temperature. For this reason, in the examples shown in FIGS. 2B and 2C, when the ambient temperature passes the threshold temperature (when it passes the threshold temperature in an upward or downward direction) even if no abnormal temperature occurs, it is erroneously detected that an abnormal temperature has occurred. In the example shown in FIG. 2C, although the temperature indicated by the solid line exceeds the threshold temperature, since the change in temperature indicated by the solid line is small (almost flat), an abnormal temperature is regarded as not having occurred.

The graph shown in FIG. 2D shows the first-order difference in temperature indicated by the solid line in the examples shown in FIGS. 2A to 2C. A curve L1 in FIG. 2D is the first-order difference in the example shown in FIG. 2A, a curve L2 is the first-order difference in the example shown in FIG. 2B, and a curve L3 is the first-order difference in the example shown in FIG. 2C. With reference to FIG. 2D, two peaks appear in each of the curves L1 to L3.

However, in the example shown in FIG. 2A, since the ambient temperature does not change, values of portions other than the peak of the curve L1 become zero. On the other hand, in the example shown in FIG. 2B, since there is an uptrend, the values of portions other than the peak in addition to the peak portion of the curve L2 also have positive values, and in the example shown in FIG. 2C, since there is a downtrend, the values of portions other than the peak in addition to the peak portion of the curve L3 also have negative values. In this manner, the first-order difference can be used as a feature amount indicating the tendency (trend) of changes in temperature because the value changes according to the tendency (trend) of changes in temperature.

The graph shown in FIG. 2E shows the second-order difference in temperature indicated by the solid line in the examples shown in FIGS. 2A to 2C. With reference to FIG. 2E, the second-order differences in the examples in FIGS. 2A to 2C are indicated by the same (or almost the same) curve. In this manner, since the second-order differences have values that do not change according to the tendency (trend) of changes in temperature, they can be used as feature amounts indicating the changes in temperature excluding the trend.

The synthesizer 14 performs synthesis processing of synthesizing a feature amount calculated by the preprocessor 13 and past determination information indicating whether the temperature data obtained in the past is normal or abnormal. This kind of synthesis processing is performed because the feature amount calculated by the preprocessor 13 does not include an absolute value of a temperature, and thus an abnormal temperature cannot be detected in detection of an abnormal temperature using only the feature amount.

For example, a case where the temperature rises sharply and then stabilizes (the temperature does not change) is considered. In such a case, in the detection of an abnormal temperature using only the feature amount, it is not possible to distinguish between a state where the temperature does not change at an abnormal temperature and a state where the temperature does not change at a normal temperature, and therefore even if an abnormal temperature occurs, there is a risk that the abnormal temperature will be unable to be detected.

In such a case, when the abnormal temperature can be detected while the temperature rises and stabilizes, it is possible to detect the abnormal temperature even if the temperature stabilizes after rising. Accordingly, in the present embodiment, the abnormal temperature is detected by using the feature amount calculated by the preprocessor 13 and the past determination information indicating whether the temperature data obtained in the past is normal or abnormal.

Specifically, when machine learning is performed by the learner 15, the synthesizer 14 generates synthesis data X1 by performing synthesis processing of synthesizing the feature amount calculated from the temperature data D1 for training in the preprocessor 13, the identification information included in the training information TR, and the past determination information. The generated synthesis data X1 is represented by, for example, a list or a vector. As the past determination information here, at least one item of identification information attached to the past temperature data acquired by the temperature acquirer 11 (for example, identification information indicating whether the temperature data obtained immediately before is normal or abnormal) can be used.

Moreover, when it is determined whether the temperature data D2 for detection is normal or abnormal by the determiner 16, the synthesizer 14 generates synthesis data X2 by performing synthesis processing of synthesizing the feature amount calculated from the temperature data D2 for detection in the preprocessor 13 and the past determination information. The synthesis data X2 generated by the synthesizer 14 is represented by, for example, a list or a vector. As the past determination information here, at least one determination result from the determiner 16 obtained in the past (for example, a determination result Y from the determiner 16 obtained immediately before) can be used. It should be noted that the synthesis data X2 does not include the identification information included in the synthesis data X1.

The learner 15 performs machine learning using the synthesis data X1 output from the synthesizer 14 as training data. It is desirable for the learner 15 to use a classification method, for example, the Random Forest technology. This is because machine learning can be done with less training data than in deep learning. As the classification method, the learner 15 may use a binary classification method such as a boost decision tree, which is a recursive division method. The learner 15 generates an identification model CM for determining an output of a plurality of decision trees by a majority vote, and provides (outputs) it to the determiner 16.

The determiner 16 determines whether the temperature data D2 for detection obtained by the temperature acquirer 11 and on which the preprocessing is performed by the preprocessor 13 and the synthesis processing is performed by the synthesizer 14 is normal or abnormal using the identification model CM output from the learner 15. The determiner 16 outputs a result of the determination indicating whether the temperature data D2 for detection is normal or abnormal to the outputter 17 and the storage 18.

The outputter 17 outputs the result of the determination by the determiner 16. The outputter 17 incudes, for example, a display device such as a liquid crystal display (LCD), and displays the result of the determination by the determiner 16 such that it can be visually recognized. In addition to the LCD, the outputter 17 may include, for example, a contact terminal to which an alarm device such as a red warning light or a buzzer can be connected, and may notify of the result of the determination by the determiner 16 using light or sound.

The storage 18 stores the result of the determination by the determiner 16. The result of the determination stored in the storage 18 (for example, the result Y of the determination by the determiner 16 obtained immediately before) is output to the synthesizer 14. The storage 18 may be realized by, for example, a volatile memory such as a random access memory (RAM), or may be realized by a non-volatile memory such as a flash read only memory (ROM) or an electrically erasable and programmable ROM (EEPROM).

Such an abnormal temperature detection device 1 is realized by a computer. For example, it may be realized by a desktop computer, a laptop computer, or a tablet computer. When the abnormal temperature detection device 1 is realized by the computer, each block (the temperature acquirer 11, the training information generator 12, the preprocessor 13, the synthesizer 14, the learner 15, the determiner 16, and the like) provided in the abnormal temperature detection device 1 is realized by a program (an abnormal temperature detection program) for realizing each function being executed by a central processing unit (CPU) provided in the computer. That is, each block provided in the abnormal temperature detection device 1 is realized by software and hardware resources in cooperation.

Here, the program for realizing the function of each block provided in the abnormal temperature detection device 1 may be recorded on a computer-readable recording medium and distributed, or distributed via a network such as the Internet. The abnormal temperature detection device 1 may be realized by using hardware such as a field-programmable gate array (FPGA), a large-scale integration (LSI), and an application specific integrated circuit (ASIC).

The computer-readable recording medium described above is, for example, a magnetic recording medium, an optical recording medium, a semiconductor memory, or the like. Examples of the magnetic recording medium include, for example, a flexible disk, a hard disk drive, and the like. Examples of the optical recording medium include a CD-ROM, a DVD (registered trademark)-ROM, and the like. Examples of the semiconductor memory include a flash read only memory (ROM) and an electrically erasable and programmable ROM (EEPROM).

<Abnormal Temperature Detection Method>

Next, operations of abnormal temperature detection device 1 will be described. The operations of the abnormal temperature detection device 1 are roughly classified into the operations at the time of training to obtain the identification model CM by performing the machine learning described above and the operations at the time of detection to detect the abnormal temperature. In the following description, the operations at the time of training by the abnormal temperature detection device 1 and the operations at the time of detection by the abnormal temperature detection device 1 will be described in order.

<<Operations at the Time of Training>>

FIG. 3 is a flowchart which shows an outline of the operations of the abnormal temperature detection device at the time of training according to the embodiment of the present invention. Processing in the flowchart shown in FIG. 3 is started, for example, when a user of the abnormal temperature detection device 1 operates an inputter (not shown) to instruct to start machine learning.

When the processing is started, first, the processing of acquiring the temperature data D1 for training is performed by the temperature acquirer 11 (step S11: first temperature acquisition step). In the processing, a plurality of pieces of temperature data D1 for training corresponding to a prescribed time (for example, about 3 to 5 minutes) are acquired once or a plurality of times. Practically, for example, 100 temperature data D1s for training are acquired 200 times.

Next, processing of generating training information TR with identification information indicating whether the temperature data D1 for training is normal or abnormal is performed by the training information generator 12 with respect to the acquired temperature data D1 for training (step S12). The identification information indicating whether the acquired temperature data D1 for training is normal or abnormal is input to the training information generator 12 by, for example, the user of the abnormal temperature detection device 1 operating an inputter (not shown). The training information TR may be generated on the basis of a simulation calculation simulating the temperature of the measurement target of the abnormal temperature detection device 1.

Next, the processing of removing noise from the generated training information TR is performed by the preprocessor 13 (step S13). For example, the processing of removing noise superimposed on the temperature data D1 for training is performed by performing filter processing such as averaging in a time axis direction with respect to the temperature data D1 for training included in the training information TR. In the filter processing, an appropriate filter suitable for characteristics of the noise superimposed on the temperature data D1 for training is selected.

Next, processing of calculating the feature amount of the temperature data D1 for training included in the training information TR is performed by the preprocessor 13 (step S14: first preprocessing step). Specifically, processing of calculating at least one of the standard deviation, the first-order difference, and the second-order difference of the temperature data D1 for training (or the averaged temperature data D1 for training) as a feature amount is performed by the preprocessor 13. The standard deviation is a feature amount indicating the magnitude of the change in temperature of the temperature data D1 for training. The first-order difference is a feature amount indicating the tendency (trend) of the change in temperature of the temperature data D1 for training. The second-order difference is a feature amount indicating the change in temperature of the temperature data D1 for training excluding the trend.

Subsequently, processing of generating the synthesis data X1 by performing synthesis processing of synthesizing the feature amount calculated from the temperature data D1 for training, the identification information included in the training information TR, and the past determination information is performed by the synthesizer 14 (step S15: a first synthesis step). As the past determination information herein, for example, identification information indicating whether the temperature data obtained immediately before by the temperature acquirer 11 is normal or abnormal can be used.

When the processing above ends, machine learning using the synthesis data X1 output from the synthesizer 14 is performed by the learner 15 (step S16: a learning step). Here, in addition to a relationship between the feature amount calculated from the temperature data D1 for training and the identification information indicating whether the temperature data D1 for training is normal or abnormal, a relationship with past determination information (identification information indicating whether temperature data obtained immediately before by the temperature acquirer 11 is normal or abnormal) is also learned. When this machine learning is performed, the identification model CM is output from the learner 15 to the determiner 16 (step S17).

Note that the processing in the flowchart shown in FIG. 3 may automatically end after, for example, a preset amount of training is performed by the user of the abnormal temperature detection device 1. Alternatively, it may end after an elapse of a time set in advance by the user of the abnormal temperature detection device 1, or may end according to an end instruction by the user of the abnormal temperature detection device 1. Alternatively, it may end when a value of the identification model CM for predetermined time series data becomes equal to or less than a predetermined value.

<<Operations at the Time of Detection>>

Figure 4:
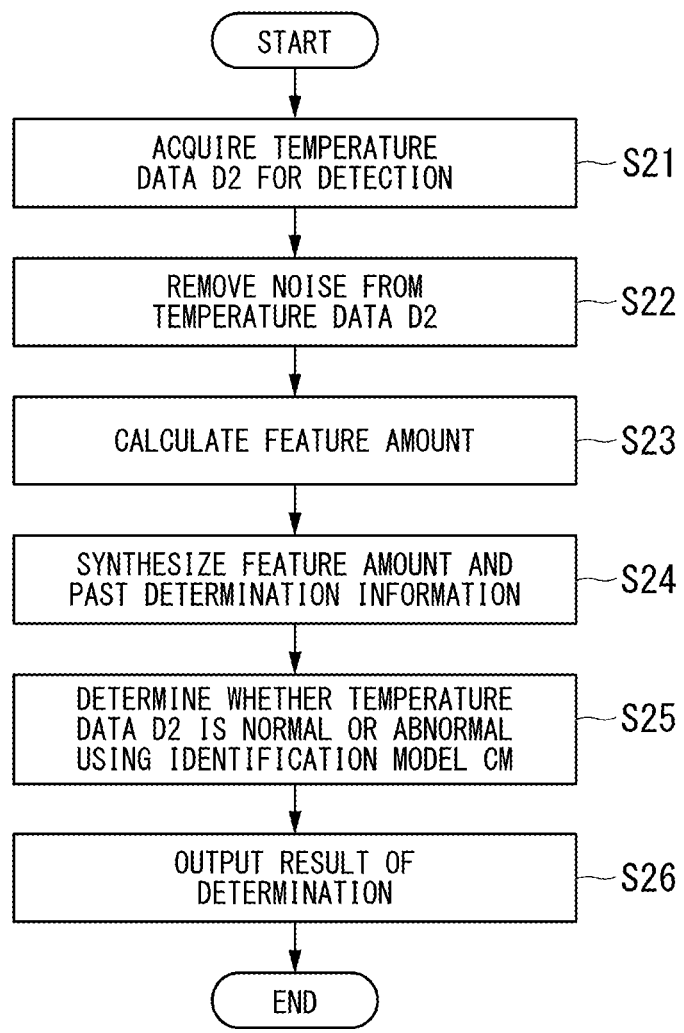
FIG. 4 is a flowchart which shows an outline of operations at the time of detecting the abnormal temperature detection device according to the embodiment of the present invention.

FIG. 4 is a flowchart which shows an outline of operations at the time of detection of the abnormal temperature detection device according to the embodiment of the present invention. Processing in the flowchart shown in FIG. 4 is started, for example, when the user of the abnormal temperature detection device 1 operates an inputter (not shown) to give an instruction to start a detection. Alternatively, the processing in the flowchart shown in FIG. 4 may be automatically started when the processing in the flowchart shown in FIG. 3 has ended.

When the processing is started, first, processing of acquiring the temperature data D2 for detection is performed by the temperature acquirer 11 (step S21: a second temperature acquisition step). In the processing, temperature data D2 for detection having the same data length as the temperature data D1 for training, which corresponds to a prescribed time (for example, about 3 to 5 minutes) (for example, 100 pieces of temperature data D2 for detection) is acquired only once. Since it is not clear whether the temperature data D2 for detection is normal or abnormal, the identification information is not input.

Next, processing of removing noise from the acquired temperature data D2 for detection is performed by the preprocessor 13 (step S22). For example, processing of removing the noise superimposed on the temperature data D2 for detection is performed using a filter similar to the filter used in the processing of step S13 shown in FIG. 3.

Next, the processing of calculating the feature amount of the temperature data D2 for detection is performed by the preprocessor 13 (step S23: a second preprocessing step). Specifically, the processing of calculating at least one of the standard deviation, the first-order difference, and the second-order difference of the temperature data D2 for detection (or the averaged temperature data D2 for detection) as the feature amount is performed by the preprocessor 13. The standard deviation is a feature amount indicating the magnitude of the change in temperature of the temperature data D2 for detection. The first-order difference is a feature amount indicating the tendency (trend) of the change in temperature of the temperature data D2 for detection. The second-order difference is a feature amount indicating the change in temperature of the temperature data D2 for detection excluding the trend.

Subsequently, processing of generating synthesis data X2 by performing synthesis processing of synthesizing the feature amount calculated from the temperature data D2 for detection and the past determination information is performed by the synthesizer 14 (step S24: a second synthesis step). As the past determination information herein, for example, the result Y of the determination (the result of the determination by the determiner 16 obtained immediately before) stored in the storage 18 can be used. For example, when the result of the determination by the determiner 16 is not stored in the storage 18 as in a case where processing in the flowchart shown in FIG. 4 is performed for the first time, for example, a value (for example, zero) meaning normality may also be used as an initial value of the result Y of the determination.

When the processing above ends, the synthesis data X2 output from the synthesizer 14 is input to the determiner 16. Then, using the identification model CM output in the processing of step S17 shown in FIG. 3, processing of determining whether the temperature data D2 for detection is normal or abnormal is performed by the determiner 16 (step S25: a determination step).

Here, as described above, the identification model CM has learned the relationship with the past determination information in addition to the relationship between the feature amount calculated from the temperature data D1 for training and the identification information indicating whether the temperature data D1 for training is normal or abnormal. Moreover, the synthesis data X2 input to the determiner 16 is obtained by synthesizing the feature amount calculated from the temperature data D2 for detection and the past determination information (the result of the determination by the determiner 16 obtained immediately before). For this reason, whether the temperature data D2 for detection is normal or abnormal is determined in consideration of the past determination information (the result of the determination by the determiner 16 obtained immediately before).

When this determination is performed, the determiner 16 outputs the result of the determination to the outputter 17 and the storage 18 (step S26). As a result, information indicating whether the temperature data D2 for detection is normal or abnormal is displayed on the display device such that it can be visually recognized. Alternatively, when it is determined that the temperature data D2 for detection is abnormal, an alarm device such as a red warning light or a buzzer notifies that the temperature data D2 is abnormal by light or sound.

Processing in the flowchart shown in FIG. 4 may automatically end, for example, when it is determined that the temperature data D2 for detection is abnormal. Alternatively, the processing in the flowchart shown in FIG. 4 may be continued according to an instruction of the user of the abnormal temperature detection device 1 or may end according to an end instruction of the user of the abnormal temperature detection device 1.

As described above, in the present embodiment, first, at the time of training, preprocessing of calculating the feature amount of the temperature data D1 for training acquired by the temperature acquirer 11 is performed, and synthesis processing of synthesizing the calculated feature amount and the past determination information indicating whether the temperature data D1 for training obtained in the past is normal or abnormal is performed. Then, a result of the synthesis processing is subjected to machine learning to generate the identification model CM. Next, at the time of detection, it is determined whether the temperature data D2 for detection acquired by the temperature acquirer 11 and subjected to the preprocessing and the synthesis processing is normal or abnormal by using the identification model CM.

As described above, in the present embodiment, in addition to the feature amount of the temperature data D1 for training, the past determination information (identification information indicating whether the temperature data D1 for training obtained in the past is normal or abnormal) is used to perform machine learning. In addition, in the present embodiment, in addition to the feature amount of the temperature data D2 for detection, the past determination information (a result of the determination by the determiner 16 obtained in the past) is used to determine whether the temperature data D2 for detection is normal or abnormal. For this reason, in the present embodiment, an abnormal temperature can be detected with high accuracy even when there is a change in ambient temperature.

The abnormal temperature detection device, the abnormal temperature detection method, and the abnormal temperature detection program according to the embodiment of the present invention have been described above, but the present invention is not limited to the embodiment described above and can be freely changed within a scope of the present invention. For example, since the abnormal temperature detection device 1 of the embodiment described above has the learner 15 and the determiner 16, machine learning may be performed to automatically update (automatic learning) the identification model CM while determining whether the temperature data D2 for detection is normal or abnormal. By automatically updating the learner in this manner, it is possible to optimize the abnormal temperature detection device 1 of the embodiment described above according to an environment of a site.

Specifically, for example, if the abnormal temperature detection device 1 has been operating for a predetermined period (for example, one year) without an abnormality being determined by the determiner 16, it is considered that temperature data obtained during that period (the temperature data D2 for detection) is normal. For this reason, the temperature data (the temperature data D2 for detection) obtained during that period may be used as the normal temperature data D1 for training to perform automatic learning.

Moreover, the automatic learning described above may be executed only during a predetermined period. For example, only temperature data in the last year may be automatically learned, and data in the past, which is older than this, may not be used for learning. Furthermore, the automatic learning described above may be started or stopped on the basis of an instruction of the user.

In addition, in the embodiment described above, a case where a temperature having significantly risen as compared to the normal state is detected as an abnormal temperature has been described as an example. However, the present invention is not limited to the case where the temperature having significantly risen as compared to the normal state is detected as the abnormal temperature, and can be applied to a case where a temperature having significantly fallen as compared to the normal state is detected as the abnormal temperature. However, it is necessary to note that appropriate identification information is given to the temperature data D1 for training.

Furthermore, the abnormal temperature detection device 1 of the embodiment described above may be realized as a single device or may be realized by cloud computing via a network. Here, cloud computing may conform to, for example, a definition (a definition recommended by the National Institute of Standards and Technology) described in the document specified by the following uniform resource locator (URL).

http://nvlpubs.nist.gov/nistpubs/Legacy/SP/nistspecial-publication800-145.pdf
https://www.ipa.go.jp/files/000025366.pdf (Supplementary Note)

An abnormal temperature detection device (1) according to one aspect of the present invention includes: a temperature acquirer (11) configured to acquire temperature data (D1, D2); a preprocessor (13) configured to perform preprocessing of calculating a feature amount of the temperature data; a synthesizer (14) configured to perform synthesis processing of synthesizing the feature amount and past determination information indicating whether the temperature data acquired in the past is normal or abnormal; a learner (15) configured to generate an identification model (CM) by performing machine learning on a result of synthesis by the synthesizer; and a determiner (16) configured to determine whether temperature data (D2) for detection which is acquired by the temperature acquirer, and on which the preprocessing is performed by the preprocessor and the synthesis processing is performed by the synthesizer, is normal or abnormal by using the identification model.

In addition, the abnormal temperature detection device according to one aspect of the present invention further includes: a training information generator (12) configured to generate training information (TR) when the machine learning is performed by the learner, identification information being attached to the training information, the identification information indicating whether the temperature data acquired by the temperature acquirer is normal or abnormal, wherein the preprocessor is configured to calculate the feature amount of the temperature data included in the training information, and wherein the synthesizer is configured to synthesize the feature amount, the identification information included in the training information, and the past determination information.

In addition, in the abnormal temperature detection device according to one aspect of the present invention, the past determination information is at least one item of the identification information attached to the temperature data in the past acquired by the temperature acquirer.

In addition, in the abnormal temperature detection device according to one aspect of the present invention, the synthesizer is configured to use at least one result of determination by the determiner acquired in the past as the past determination information when the determination is performed by the determiner.

In addition, in the abnormal temperature detection device according to one aspect of the present invention, the preprocessor is configured to calculate, as the feature amount, at least one of a standard deviation, a first-order difference, or a second-order difference of the temperature data or averaged temperature data.

In addition, in the abnormal temperature detection device according to one aspect of the present invention, when the machine learning is performed by the learner, the preprocessor is configured to remove noise from the training information generated by the training information generator, and configured to calculate the feature amount of the temperature data included in the training information from which the noise has been removed.

In addition, in the abnormal temperature detection device according to one aspect of the present invention, when the determiner determines whether the temperature data for detection is normal or abnormal, the preprocessor is configured to remove noise from the temperature data for detection acquired by the temperature acquirer, and configured to calculate the feature amount of the temperature data for detection from which the noise has been removed.

An abnormal temperature detection method according to another aspect of the present invention includes: acquiring temperature data (D1) by a temperature acquirer (S11); performing, by a preprocessor, preprocessing of calculating a feature amount of the temperature data (S14); performing, by a synthesizer, synthesis processing of synthesizing the feature amount and past determination information indicating whether the temperature data acquired in the past is normal or abnormal (S15); generating, by a learner, an identification model (CM) by performing machine learning on a result of synthesis by the synthesizer (S16); acquiring temperature data (D2) for detection by the temperature acquirer (S21); performing, by the preprocessor, the preprocessing on the temperature data for detection (S23); performing, by the synthesizer, the synthesis processing by using a result of the preprocessing by the preprocessor (S24); and determining, by a determiner, whether the temperature data for detection on which the preprocessing and the synthesis processing are performed is normal or abnormal by using the identification model (S25).

In addition, the abnormal temperature detection method according to one aspect of the present invention further includes: generating, by a training information generator, training information when the machine learning is performed by the learner, identification information being attached to the training information, the identification information indicating whether the temperature data acquired by the temperature acquirer is normal or abnormal; calculating, by the preprocessor, the feature amount of the temperature data included in the training information; and synthesizing, by the synthesizer, the feature amount, the identification information included in the training information, and the past determination information.

In addition, in the abnormal temperature detection method according to one aspect of the present invention, the past determination information is at least one item of the identification information attached to the temperature data in the past acquired by the temperature acquirer.

In addition, the abnormal temperature detection method according to one aspect of the present invention further includes: using, by the synthesizer, at least one result of determination by the determiner acquired in the past as the past determination information when the determination is performed by the determiner.

In addition, the abnormal temperature detection method according to one aspect of the present invention further includes: calculating, by the preprocessor, as the feature amount, at least one of a standard deviation, a first-order difference, or a second-order difference of the temperature data or averaged temperature data.

In addition, the abnormal temperature detection method according to one aspect of the present invention further includes: when the machine learning is performed by the learner, removing, by the preprocessor, noise from the training information generated by the training information generator; and calculating the feature amount of the temperature data included in the training information from which the noise has been removed.

In addition, the abnormal temperature detection method according to one aspect of the present invention further includes: when the determiner determines whether the temperature data for detection is normal or abnormal, removing, by the preprocessor, noise from the temperature data for detection acquired by the temperature acquirer, and calculating the feature amount of the temperature data for detection from which the noise has been removed.

A non-transitory computer readable storage medium according to another aspect of the present invention stores a program executed by a computer, and the program instructing the computer to: acquire temperature data; perform preprocessing of calculating a feature amount of the temperature data; perform synthesis processing of synthesizing the feature amount and past determination information indicating whether the temperature data acquired in the past is normal or abnormal; generate an identification model by performing machine learning on a result of the synthesis processing; acquire temperature data for detection; perform the preprocessing on the temperature data for detection; perform the synthesis processing by using a result of the preprocessing; and determine whether the temperature data for detection on which the preprocessing and the synthesis processing are performed is normal or abnormal by using the identification model.

In addition, in the non-transitory computer readable storage medium according to one aspect of the present invention, the program further instructs the computer to: generate training information when the machine learning is performed, identification information being attached to the training information, the identification information indicating whether the temperature data is normal or abnormal; calculate the feature amount of the temperature data included in the training information; and synthesize the feature amount, the identification information included in the training information, and the past determination information.

In addition, in the non-transitory computer readable storage medium according to one aspect of the present invention, the past determination information is at least one item of the identification information attached to the temperature data in the past.

In addition, in the non-transitory computer readable storage medium according to one aspect of the present invention, the program further instructs the computer to: use at least one result of determination acquired in the past as the past determination information when the determination is performed.

In addition, in the non-transitory computer readable storage medium according to one aspect of the present invention, the program further instructs the computer to: calculate, as the feature amount, at least one of a standard deviation, a first-order difference, or a second-order difference of the temperature data or averaged temperature data.

In addition, in the non-transitory computer readable storage medium according to one aspect of the present invention, the program further instructs the computer to: when the machine learning is performed, remove noise from the training information; and calculate the feature amount of the temperature data included in the training information from which the noise has been removed.

An abnormal temperature detection program according to another aspect of the present invention instructs a computer to: acquire temperature data; perform preprocessing of calculating a feature amount of the temperature data; perform synthesis processing of synthesizing the feature amount and past determination information indicating whether the temperature data acquired in the past is normal or abnormal; generate an identification model by performing machine learning on a result of the synthesis processing; acquire temperature data for detection; perform the preprocessing on the temperature data for detection; perform the synthesis processing by using a result of the preprocessing; and determine whether the temperature data for detection on which the preprocessing and the synthesis processing are performed is normal or abnormal by using the identification model.

According to the present invention, it is possible to detect an abnormal temperature with high accuracy even when there is a change in ambient temperature.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An abnormal temperature detection device comprising:
 a temperature acquirer configured to acquire temperature data;
 a preprocessor configured to perform preprocessing of calculating a feature amount of the temperature data;
 a synthesizer configured to generate first synthesis data for machine learning and second synthesis data for determining whether the temperature data for detection is normal or abnormal;
 a learner configured to generate an identification model by performing machine learning on the first synthesis data; and
 a determiner configured to determine whether the temperature data for detection which is acquired by the temperature acquirer is normal or abnormal by using the second synthesis data and the identification model; and
 a training information generator configured to generate training information when the machine learning is performed by the learner, identification information being attached to the training information, the identification information indicating whether temperature data for training acquired by the temperature acquirer is normal or abnormal,
 wherein the preprocessor is configured to calculate the feature amount of the temperature data for training included in the training information when the machine learning is performed by the learner, and
 wherein the synthesizer is configured to:
  generate the first synthesis data by synthesizing the feature amount of the temperature data for training, the identification information included in the training information, and past determination information which is at least one item of the identification information attached to the temperature data in the past acquired by the temperature acquirer; and generate the second synthesis data by synthesizing the feature amount of the temperature data for detection and the past determination information.

2. The abnormal temperature detection device according to claim 1, wherein the preprocessor is configured to calculate, as the feature amount, at least one of a standard deviation, a first-order difference, or a second-order difference of the temperature data or averaged temperature data.

3. The abnormal temperature detection device according to claim 1, wherein, when the machine learning is performed by the learner, the preprocessor is configured to remove noise from the training information generated by the training information generator, and configured to calculate the feature amount of the temperature data included in the training information from which the noise has been removed.

4. The abnormal temperature detection device according to claim 1, wherein, when the determiner determines whether the temperature data for detection is normal or abnormal, the preprocessor is configured to remove noise from the temperature data for detection acquired by the temperature acquirer, and configured to calculate the feature amount of the temperature data for detection from which the noise has been removed.

5. An abnormal temperature detection method comprising:

acquiring temperature data by a temperature acquirer;

performing, by a preprocessor, preprocessing of calculating a feature amount of the temperature data;

generating, by a synthesizer, first synthesis data for machine learning and second synthesis data for determining whether the temperature data for detection is normal or abnormal;

generating, by a learner, an identification model by performing machine learning on the first synthesis data;

determining, by a determiner, whether the temperature data for detection which is acquired by the temperature acquirer is normal or abnormal by using the second synthesis data and the identification model;

generating, by a training information generator, training information when the machine learning is performed by the learner, identification information being attached to the training information, the identification information indicating whether temperature data for training acquired by the temperature acquirer is normal or abnormal;

calculating, by the preprocessor, the feature amount of the temperature data for training included in the training information when the machine learning is performed by the learner;

generating, by the synthesizer, the first synthesis data by synthesizing the feature amount of the temperature data for training, the identification information included in the training information, and past determination information which is at least one item of the identification information attached to the temperature data in the past acquired by the temperature acquirer; and generating, by the synthesizer, the second synthesis data by synthesizing the feature amount of the temperature data for detection and the past determination information.

6. The abnormal temperature detection method according to claim 5, further comprising:

calculating, by the preprocessor, as the feature amount, at least one of a standard deviation, a first-order difference, or a second-order difference of the temperature data or averaged temperature data.

7. The abnormal temperature detection method according to claim 5, further comprising:

when the machine learning is performed by the learner, removing, by the preprocessor, noise from the training information generated by the training information generator; and calculating the feature amount of the temperature data included in the training information from which the noise has been removed.

8. The abnormal temperature detection method according to claim 5, further comprising:

when the determiner determines whether the temperature data for detection is normal or abnormal, removing, by the preprocessor, noise from the temperature data for detection acquired by the temperature acquirer, and calculating the feature amount of the temperature data for detection from which the noise has been removed.

9. A non-transitory computer readable storage medium storing a program executed by a computer, the program instructing the computer to:

acquire temperature data;

perform preprocessing of calculating a feature amount of the temperature data;

generate first synthesis data for machine learning and second synthesis data for determining whether the temperature data for detection is normal or abnormal;

generate an identification model by performing machine learning on the first synthesis data;

determine whether the temperature data for detection is normal or abnormal by using the second synthesis data and the identification model;

generate training information when the machine learning is performed, identification information being attached to the training information, the identification information indicating whether temperature data for training is normal or abnormal;

calculate the feature amount of the temperature data for training included in the training information when the machine learning is performed;

generate the first synthesis data by synthesizing the feature amount of the temperature data for training, the identification information included in the training information, and past determination information which is at least one item of the identification information attached to the temperature data in the past; and generate the second synthesis data by synthesizing the feature amount of the temperature data for detection and the past determination information.

10. The non-transitory computer readable storage medium according to claim 9, wherein the program further instructs the computer to:

calculate, as the feature amount, at least one of a standard deviation, a first-order difference, or a second-order difference of the temperature data or averaged temperature data.

11. The non-transitory computer readable storage medium according to claim 9, wherein the program further instructs the computer to:

when the machine learning is performed, remove noise from the training information; and calculate the feature amount of the temperature data included in the training information from which the noise has been removed.

\* \* \* \* \*